Figure 1:
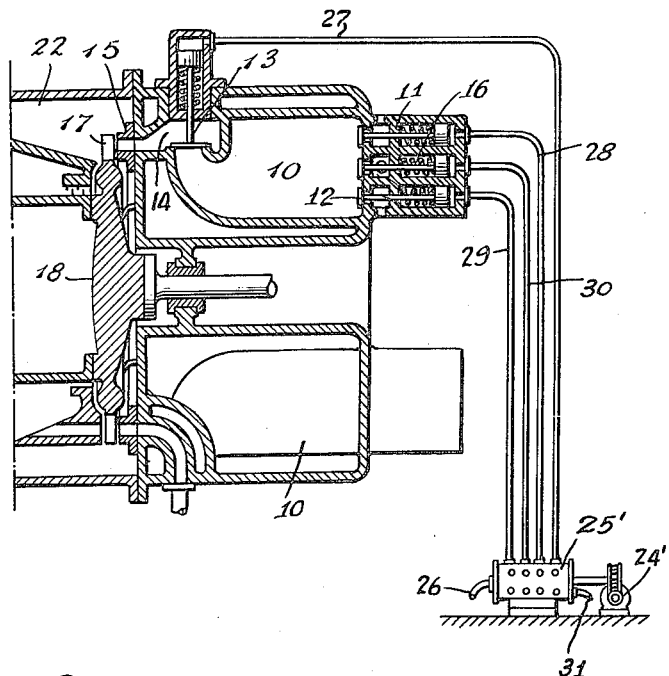

Oct. 1, 1929.  F. HOFMANN  1,730,210
SCAVENGING DEVICE FOR GAS TURBINES
Filed July 30, 1926  2 Sheets-Sheet 1

INVENTOR
FRIEDRICH HOFMANN
BY
ATTORNEYS

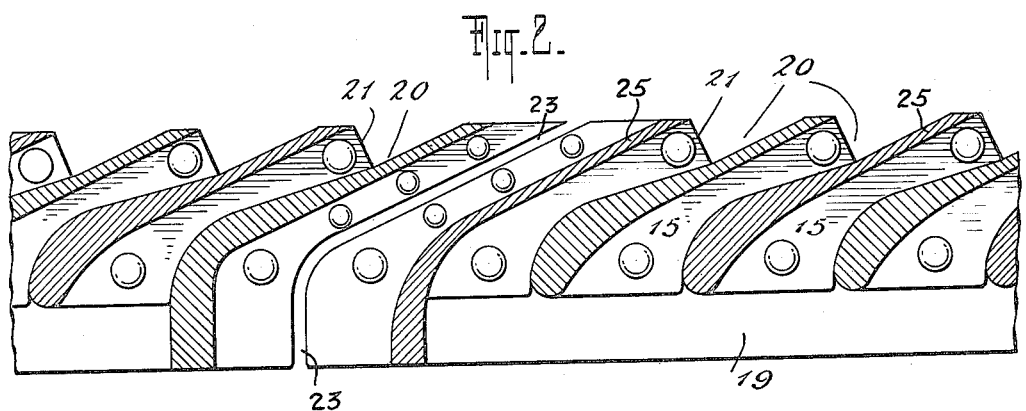
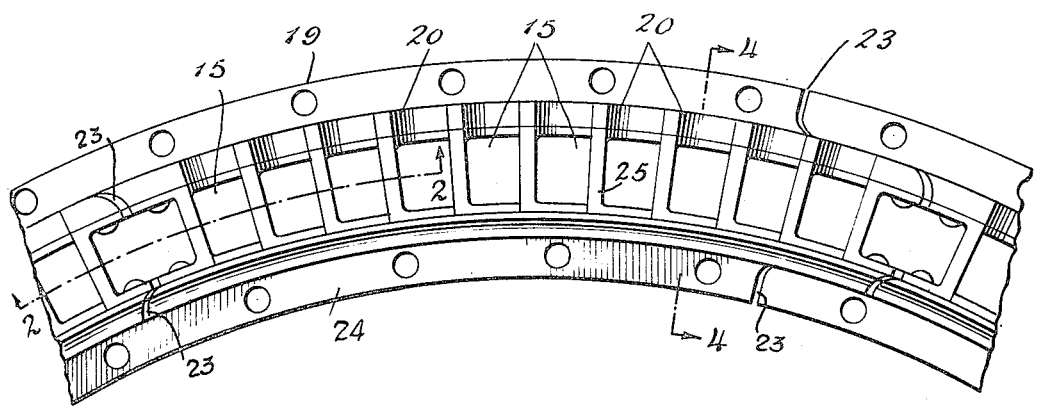

Patented Oct. 1, 1929

1,730,210

UNITED STATES PATENT OFFICE

FRIEDRICH HOFMANN, OF MULHEIM-RUHR, GERMANY, ASSIGNOR TO HOLZWARTH GAS TURBINE CO., OF SAN FRANCISCO, CALIFORNIA, A CORPORATION OF DELAWARE

SCAVENGING DEVICE FOR GAS TURBINES

Application filed July 30, 1926. Serial No. 125,847.

In turbines of the type disclosed in several Letters Patent granted to me in the United States and in other countries, the rotor is driven by the action of combustion gases coming from an explosion chamber and arrangements have been provided in turbines of this type for sending a blast of scavenging air through the combustion chambers and the parts connected therewith, that is, the chamber containing the valves which control the passage from the explosion chamber to the combustion gas nozzles, and such nozzle itself. The combustion chambers have inlet valves controlling the admission of fuel and air and also separate inlet valves for the admission of scavenging air. During the scavenging period, the valve admitting scavenging air is open, as is also the valve controlling the connection of the explosion chamber with the corresponding combustion gas nozzle. The scavenging air is admitted to the explosion chamber under a pressure corresponding approximately to that of a column of water of a height of two or three yards. At its exit from the combustion gas nozzle, the scavenging air has a velocity of about 100 yards per second. The speed at which the rotor blades move past the combustion gas nozzles is considerably higher, and amounts to from 175 to 250 yards per second, upon an average. The driving medium (combustion gases and, in some cases, steam) passes out of the nozzles at a much higher speed than the scavenging air, say a speed about ten times as high or even more. The blades of the rotor, at their entrance ends, are disposed at such an angle to the plane of rotation of said rotor that the driving medium issuing from the nozzles at a high speed, can enter the blade channels very readily. The jets of scavenging air, however, issuing at a speed of only about 100 yards per second, cannot enter the blade channels which move at a much higher speed and thus the scavenging air strikes the rear surface of the rotor blades and is deflected by them. The scavenging air therefore does not pass through the blade channels, nor is it intended that it should do so. The scavenging air escapes through the clearance existing between the outlets of the nozzles and the entrance side of the rotor. A construction of this general character is shown in the German Patent No. 239,970 of May 3, 1911, granted to Holzwarth and Junghans.

During experimental work undertaken with the purpose of increasing the efficiency of the turbine, it was found that the action of the driving jets and particularly of the combustion gas jets, was increased if the slit or clearance between the mouth of the nozzles and the rotor was made narrower. This however, without any other change, would impede the escape of the scavenging air and thus the explosion would take place under unfavorable conditions and the engine would soon become too hot.

According to my present invention improved means are provided for an efficient scavenging of the turbine parts notwithstanding a reduction of the clearance between the nozzles and the rotor. I have found that the combustion gases owing to their high velocity leave the nozzle outlets in the longitudinal direction of the nozzles even if there should be in the side wall of the nozzle an opening which apparently would permit such combustion gases to escape laterally. On the other hand, when the scavenging air travels through the nozzles at a much lower velocity, such scavenging air will readily escape through the lateral openings as it is barred from entering the rotor blade channels.

Figure 4:
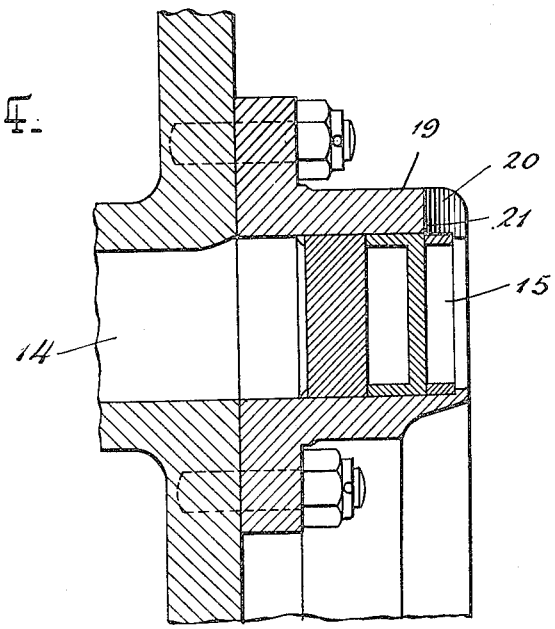

A satisfactory and preferred embodiment of my present invention is shown in the accompanying drawings in which Fig. 1 is an axial section of a turbine embodying my invention; Fig. 2 is a fragmentary section on line 2—2 of Fig. 3 on an enlarged scale; Fig. 3 is a fragmentary cross-section; Fig. 4 is a cross-section on line 4—4 of Fig. 3.

In the stationary part of the turbine are provided the explosion chambers 10 having fuel inlets controlled by valves 11 and air inlets controlled by valves 12, the fuel and air thus admitted being ignited in any suitable way and the combustion gases then being conducted past the outlet valves 13 to the valve chamber 14 and the nozzles 15. The explosion chambers are also provided with inlet valves 16 for the admission of the scavenging air. All the valves, including the outlet valve 13, the fuel and air valves 11 and 12, and the scavenging air valve 16, are opened and closed at definite intervals by means of a distributor 25' having a rotor which is rotated by a motor 24'. The rotor is so constructed as to connect an oil pressure conduit 26 with the conduits 27, 28, 29 and 30 leading to valve cylinders in which pistons, connected to the several valves, are slidably mounted and subsequently to disconnect said pressure conduit from the other conduits. When any one of the conduits 27—30 is connected to the pressure conduit 26, the corresponding valve piston is moved against the action of the valve spring to open the associated valve. As soon as the connection between pressure conduit 26 and one of the other conduits 27—30 is broken, such other conduit is connected to an exhaust or suction conduit 31 and the pressure oil from the valve cylinder discharges into said conduit 31, whereupon the valve closes under the action of its spring. A more detailed description of the distributor may be had from United States patent to Holzwarth No. 877,194.

An annular set of nozzles 15 is formed by two concentric rings 19 and 24 between which partitions, formed by blades 25, are inserted. The outer edges of these partitions, forming those sides of the nozzle mouth which extend in the longitudinal direction of the rotor blades, as well as the edge of the inner ring 24, are arranged in close proximity to the rotor thereby restricting the clearance with the same to very narrow limits, through which clearance the low pressure scavenging air cannot pass. To provide an outlet for the same, the ring 19 of angular cross section is provided with lateral openings preferably by cutting out triangular portions to form recesses 20. It is very important in order to secure the best practical results that the one edge 21 of the recesses 20 which extend transverse to the longitudinal direction of the respective nozzle should be very sharp or knifelike. As explained above, the object is to have the combustion gases or other driving medium which pass through the nozzles at high speed, issue from the nozzles in a straight jet, without any escape through the recesses 20. I have found that this desirable action takes place in a very satisfactory manner as long as the edges 21 are very sharp, but that if said edges are rounded a portion of the combustion gases will be deflected laterally and escape through the recesses 20. It will be observed that these lateral recesses or re-entrant edges of the nozzle mouths are provided at a point of the nozzles 15, where the combustion gases have been expanded fully or substantially so; in other words, at the recesses 20 the combustion gases have practically their outlet pressure, that is, the pressure under which they pass into the outlet chamber 22. It will be understood that the nozzles 15 will have to be constructed in such a way that even at the inner edges 21 of the recesses 20 the combustion gases will have been expanded down to the outlet pressure.

The vertical flange of the ring 19 is preferably provided with slits, such as 23 shown in Fig. 3, and as indicated by the dotted line in Fig. 4, to permit expansion of the material of such flange when exposed to high temperature. The vertical flange of the bottom ring 24 may similarly be provided with slits.

Various changes in the specific form shown and described may be made within the scope of the claims without departing from the spirit of my invention.

I claim:

1. A turbine provided with a rotor, including a set of rotor blades, a nozzle arranged in operative relation to said rotor, and mechanism for discharging alternately a driving medium under relatively high pressure and a scavenging medium under relatively low pressure through said nozzle, the latter having those sides of its mouth which extend in the longitudinal direction of said rotor blades, in close proximity to the same, thereby defining a narrow clearance with said rotor, and having an opening in one of the other sides of its mouth to permit the escape of said scavenging medium.

2. A turbine provided with a rotor, including a set of rotor blades, a nozzle arranged in operative relation to said rotor, and mechanism for discharging alternately a driving medium under relatively high pressure and a scavenging medium under relatively low pressure through said nozzle, those sides of the mouth of the latter which extend in the longitudinal direction of said rotor blades, being in close proximity to the same thereby defining a narrow clearance with said rotor, and one of the other sides of said mouth being re-entered so as to define a triangular opening with the rotor which permits the escape of said scavenging medium.

3. A turbine provided with a rotor, including a set of rotor blades, a nozzle arranged in operative relation to said rotor, and mechanism for discharging alternately a driving medium under relatively high pressure and a scavenging medium under relatively low pressure through said nozzle, those sides of the mouth of the latter which extend in the longitudinal direction of said rotor blades, being in close proximity to the same thereby defining a narrow clearance with said rotor, and one of the other sides of said mouth having an angular recess to permit the escape of said scavenging medium, the two edges of said recess extending longitudinally, respectively transversely, to said nozzle, and the transverse edge being made sharp to prevent the lateral escape of the high-pressure driving medium.

4. A turbine provided with a rotor, an annular set of nozzles arranged in operative relation to said rotor and formed by two concentric rings having intermediate partitions, and mechanism for discharging through said nozzles alternately a driving medium under relatively high pressure and a scavenging medium under relatively low pressure, the edges of said partitions being in close proximity to said rotor, and one of said rings being provided with openings which permit the escape of said scavenging medium.

5. A turbine provided with a rotor, an annular set of nozzles arranged in operative relation to said rotor, and formed by two concentric rings having intermediate partitions, and mechanism for discharging through said nozzles alternately a driving medium under relatively high pressure and a scavenging medium under relatively low pressure, the edges of said partitions being in close proximity to said rotor and one of said rings being provided with recesses in its rim to permit the escape of said scavenging medium, each recess having a sharp edge transverse to the longitudinal direction of the respective nozzle.

6. A turbine provided with a rotor, an annular set of nozzles arranged in operative relation to said rotor and formed by two concentric rings having intermediate partitions and transverse slits to permit expansion and contraction, the edges of said partitions being in close proximity to said rotor, and mechanism for discharging through said nozzles alternately a driving medium under relatively high pressure and a scavenging medium under relatively low pressure, one of said rings being provided with lateral openings between said partitions to permit the escape of said scavenging medium.

In testimony whereof I have hereunto set my hand.

FRIEDRICH HOFMANN.